(12) United States Patent
Miller

(10) Patent No.: US 9,704,374 B1
(45) Date of Patent: Jul. 11, 2017

(54) CELLULAR PHONE CASE HAVING LOCATION IDENTIFICATION

(71) Applicant: Justin Miller, Little River, SC (US)

(72) Inventor: Justin Miller, Little River, SC (US)

( * ) Notice: Subject to any disclaimer, the term of this patent is extended or adjusted under 35 U.S.C. 154(b) by 0 days.

(21) Appl. No.: 15/147,855

(22) Filed: May 5, 2016

(51) Int. Cl.
| | |
|---|---|
| H04B 7/00 | (2006.01) |
| H04M 11/04 | (2006.01) |
| H04M 1/00 | (2006.01) |
| G08B 21/24 | (2006.01) |
| G08B 5/36 | (2006.01) |
| G08B 3/00 | (2006.01) |
| G08B 25/00 | (2006.01) |

(52) U.S. Cl.
CPC .............. *G08B 21/24* (2013.01); *G08B 3/00* (2013.01); *G08B 5/36* (2013.01); *G08B 25/00* (2013.01); *H04M 2250/02* (2013.01)

(58) Field of Classification Search
CPC ....... H04M 1/026; H04B 1/38; H04B 1/3888; H04W 4/22; G08B 21/0277
USPC ............. 455/575.1, 575.8, 41.1–41.3, 550.1, 455/41.2–41.3, 404.1–404.2
See application file for complete search history.

(56) References Cited

U.S. PATENT DOCUMENTS

| | | | | |
|---|---|---|---|---|
| 2011/0007463 A1* | 1/2011 | Hodges | ................ | H05K 5/0239 361/679.01 |
| 2012/0154119 A1* | 6/2012 | Schepps | ................ | G08B 21/24 340/10.1 |
| 2013/0271264 A1* | 10/2013 | Page | ........................ | G08B 1/08 340/6.1 |
| 2013/0273944 A1* | 10/2013 | Wilson | .................. | H04M 1/026 455/457 |
| 2014/0342668 A1* | 11/2014 | Kyomitsu | .......... | G07C 9/00944 455/41.2 |
| 2016/0110938 A1* | 4/2016 | Kleve | ................. | G07C 9/00007 340/5.61 |
| 2016/0191096 A1* | 6/2016 | Kishimoto | ............. | H04B 17/10 455/67.11 |
| 2017/0018132 A1* | 1/2017 | Seagraves | .......... | G07C 9/00309 |

* cited by examiner

*Primary Examiner* — Simon Nguyen
(74) *Attorney, Agent, or Firm* — Gulf Coast Intellectual Property Group

(57) ABSTRACT

A cellular phone case configured to be communicably coupled to a key fob wherein the key fob provides the ability to transmit signals to the cellular phone case in order to activate an audio and visual signal to locate the cellular phone case. The cellular phone case includes a body having a rear wall and four sidewalls formed to receive a cellular phone. The body includes a first light and second light mounted to the rear wall and one of the four sidewalls respectively. A speaker is mounted to the body. Secured to opposing sides of the body are emergency activation buttons. The key fob includes a controller disposed within a housing that is communicably coupled to a central processing unit disposed within the body of the cellular phone case. A visual activation button and audio activation button are located on the housing of the key fob.

20 Claims, 2 Drawing Sheets

US 9,704,374 B1

CELLULAR PHONE CASE HAVING LOCATION IDENTIFICATION

PRIORITY UNDER 35 U.S.C SECTION 119(E) & 37 C.F.R. SECTION 1.78

This nonprovisional application claims priority based upon the following prior United States Provisional Patent Application entitled: Cellular Phone Case, Application No. 62/159,858 filed May 11, 2015, in the name of Justin Miller, which is hereby incorporated by reference for all purposes.

FIELD OF THE INVENTION

The present invention relates generally to cellular phone cases, more specifically but not by way of limitation, a cellular phone case that is communicably linked to a device such as but not limited to a key fob wherein the key fob and cellular phone case leverage a wireless communication to assist in identifying the location of each.

BACKGROUND

Cellular phones now proliferate our society. In the United States alone over 90% of adults own a cellular phone. These devices have replaced traditional land lines for many users. Cellular phones are now manufactured having sizes that easily fit into a pocket of a user, which enhances their mobility but also has lead to an issue of misplacement of the cellular phones. As cellular phones are small they are easily misplaced by users. Once a user has misplaced their cellular phone they have limited techniques to attempt to locate the position of the phone. While some software applications exist to assist a user in tracking the location of the phone, these applications are unable to do so if the phone has been turned off or the battery is no longer charged.

The aforementioned existing technology for phone location assistance is all dependent on the phone itself. Any malfunctioning of the cellular phone and the technology is rendered useless. As is known in the art, the majority of cellular phone users utilize a protective case that is surroundably mounted to the cellular phone. Existing protective cases provide impact and other types of protection for the cellular phone. No existing cellular phone case is configured to provide location assistance for the cellular phone to which it is surroundably mounted thereto.

Accordingly, there is a need for a cellular phone case that is configured to provide location assistance for the cellular phone to which it is attached.

SUMMARY OF THE INVENTION

It is the object of the present invention to provide a cellular phone case that is configured to provide location assistance thereof that is configured to provide both audio and visual signals to assist in the location of the cellular phone case.

Another object of the present invention is to provide a cellular phone case operable to provide a technique of locating the cellular phone to which it is operably coupled wherein the cellular phone case is communicably coupled to a key fob.

A further object of the present invention is to provide a cellular phone case that is configured to provide location assistance thereof wherein the cellular phone case includes at least one audio speaker configured to provide an audio alert upon activation thereof.

Still another object of the present invention is to provide a cellular phone case operable to provide a technique of locating the cellular phone to which it is operably coupled wherein the cellular phone case includes a first light formed on the side thereof that is operable to illuminate subsequent the activation thereof.

An additional object of the present invention is to provide a cellular phone case that is configured to provide location assistance thereof wherein the cellular phone case includes a second light secured to the rear surface thereof that is operable to illuminate ensuing activation thereof.

Yet a further object of the present invention is to provide a cellular phone case operable to provide a technique of locating the cellular phone to which it is operably coupled wherein the second light is formed in the shape of a logo such as but not limited to a sports team logo.

Another object of the present invention is to provide a cellular phone case that is configured to provide location assistance thereof wherein the cellular phone case includes an integrated and independent power supply providing power for the cellular phone case.

An alternative object of the present invention is to provide a cellular phone case operable to provide a technique of locating the cellular phone to which it is operably coupled wherein the cellular phone case includes an emergency assist interface that is configured to place a call to 911 upon engagement by the user.

Still an additional object of the present invention is to provide a cellular phone case that is configured to provide location assistance thereof wherein the cellular phone case includes an interface configured to provide location assistance of the key fob of the present invention.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
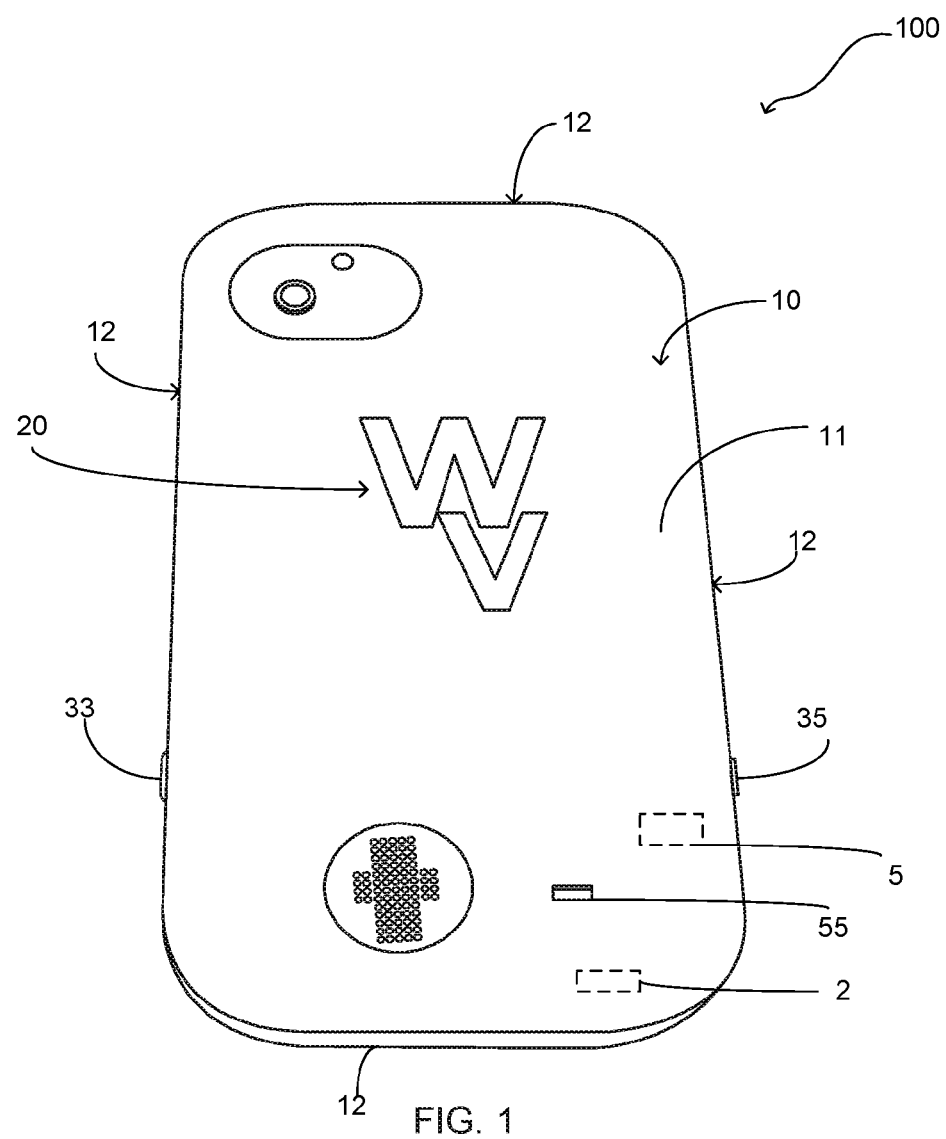
FIG. 1 is a rear view of the cellular phone case of the present invention.
Figure 2:
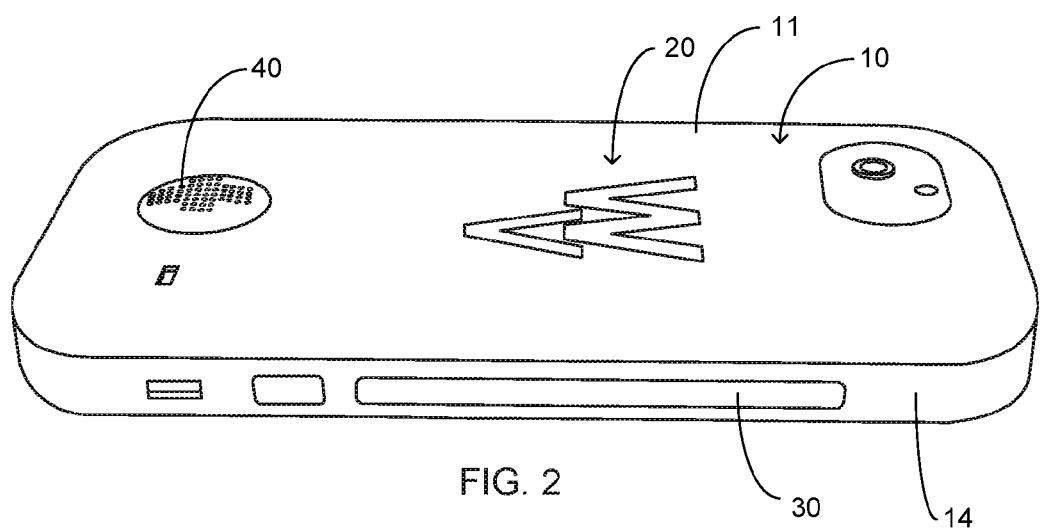
FIG. 2 is a side perspective view of the cellular phone case of the present invention.

Referring now to the drawings submitted herewith, wherein various elements depicted therein are not necessarily drawn to scale and wherein through the views and figures like elements are referenced with identical reference numerals, there is illustrated a cellular phone case 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1 the cellular phone case 100 includes a body 10. The body 10 is manufactured from a suitable material such as but not limited to rubber or plastic and includes a rear wall 11 and integrally formed side walls 12 forming an interior cavity (not particularly illustrated herein) wherein the interior cavity is configured to receive a cellular phone therein. It is contemplated within the scope of the present invention that the body 10 could be manufactured in various shapes and sizes so as to be configured to surroundably mount a variety of different cellular phones.

Formed in the rear surface 11 of the body 10 is a first light 20. The first light 20 as further discussed herein is configured to be illuminated subsequent activation thereof so as to provide a visual signal to a user in order to identify the physical location of the cellular phone case 100. While no particular type of light is required, good results have been achieved utilizing a LED light to manufacture the first light 20. It is further contemplated within the scope of the present invention that the first light 20 is formed in the shape of a logo, such as but not limited to a sports team logo. The first light 20 is positioned on the rear surface 11 of the body so as to provide visual location assistance to a user when the cellular phone case 100 is positioned such that the phone is adjacent a support surface and the rear surface 11 is exposed. The cellular phone case 100 further includes a second light 30. The second light 30 is formed in the sidewall 14 of the body 10 utilizing suitable techniques. The second light 30 is rectangular in shape and extends substantially the length of the sidewall 14. The second light 30 is illuminated subsequent the activation thereof utilizing key fob 60 as further discussed herein. The presence of the second light 30 and its specific location on the sidewall 14 provides a technique to provide a visual signal to a user when the cellular phone case 100 is either positioned with the rear surface 11 against a support surface or if the rear surface 11 is covered. Either of the aforementioned positions of the cellular phone case 100 render the first light 20 invisible and as such the second light 30 functions to provide a visible light signal to a user. It is further contemplated within the scope of the present invention that the body 10 includes a third light identical to the second light 30 that is mounted on the opposing sidewall 12.

Secured to the rear surface 11 of the body 10 is a speaker 40 the speaker 40 is a conventional audio speaker and is configured to produce an audible alarm subsequent activation thereof in order to assist a user in locating the cellular phone case 100. While one speaker 40 is illustrated herein, it is contemplated within the scope of the present invention that the cellular phone case 100 could have more than one speaker 40.

Integrally mounted onto opposing sidewalls 12 of the body 10 are the emergency assistance interface buttons 33,35. The emergency assistance interface buttons 33,35 are configured to provide a technique for a user of the cellular phone case 100 to place an assistance call to 911 or a similar service. The emergency assistance interface buttons 33,35 are electrically coupled to a cellular phone disposed within the cellular phone case 100 and wherein the cellular phone has been programmed so as to identify the emergency assistance interface buttons 33,35 and their intended function. The emergency assistance interface buttons 33,35 are located on opposing sidewalls 12 in order to prevent the unintentional simultaneous depression of both emergency assistance interface buttons 33,35. In use, a user will simultaneously depress the emergency assistance interface buttons 33,35 in order to send a signal to a cellular phone operably coupled to the cellular phone case 100 to place a call to 911 or a similar service. The opposing sidewall 12 location of the emergency assistance interface buttons 33,35 ensures the prevention of accidental activation.

A fob activation button 55 is integrated into the rear surface 11 of the body 12. The fob activation button 55 is operable to activate an audio alarm signal via speaker 97 on the key fob 60 in order to identify the location thereof as further discussed herein. The cellular phone case 100 includes an independent power supply 5 disposed therein operable to provide power thereto. While no particular power supply is required, good results have been achieved utilizing a lithium ion battery for the power supply 5. Additionally, a central processing unit 2 is disposed within the body 12 that is configured to provide the operation of the cellular phone case 100 as described herein. The central processing unit 2 is a conventional integrated circuit having the necessary electronics to store, transmit, receive and manipulate data. The central processing unit 2 further controls the wireless communication between the cellular phone case 100 and the key fob 60. It is contemplated within the scope of the present invention that the key fob 60 and cellular phone case 100 utilize Bluetooth or other similar wireless communication protocols to execute the desired functionality as described herein.

Figure 3:
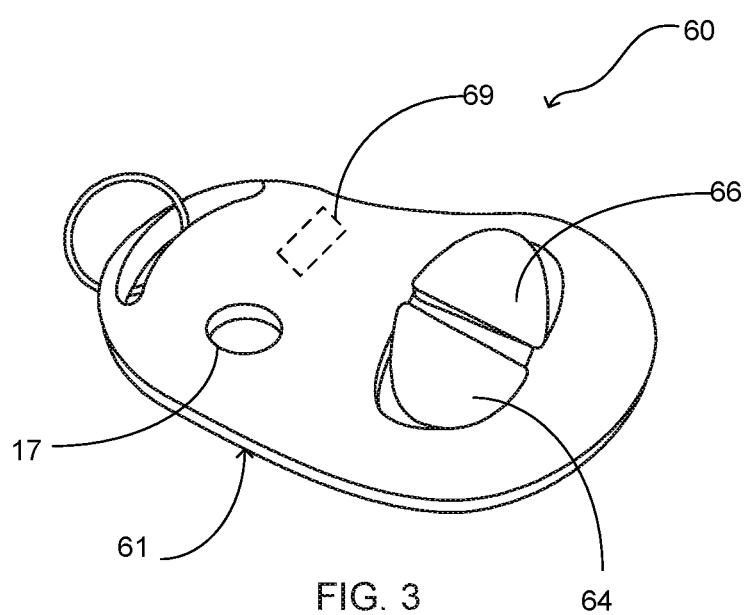
FIG. 3 is a perspective view of the key fob of the present invention.

Referring in particular to FIG. 3, the key fob 60 is illustrated therein. The key fob 60 includes housing 61 manufactured from a suitable durable material such as but not limited to plastic. The key fob 60 includes the light activation button 64 and the audio activation button 66. The light activation button 64 is configured to activate the first light 20 and second light 30 ensuing depression thereof. Upon depression of the light activation button 64 a wireless signal is sent via the controller 69 of the key fob 60, which is received by the central processing unit 2. Upon receipt of the aforementioned signal, the central processing unit 2 activates the first light 20 and second light 30 so as to illuminate and assist a user in locating the cellular phone case 100. Similarly, with the audio activation button 64, subsequent engagement thereof, a wireless signal is transmitted via the controller 69 to the central processing unit 2. Upon receipt of the signal initiated by engagement of the audio activation button 66 the speaker 40 will emit a sound therefrom in order to assist in the location of the cellular phone case 100. It is contemplated within the scope of the present invention that the first light 20, second light 30 and speaker 40 could be activated with a single button present on the key fob 60.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A cellular phone case comprising:
   a body, said body having a rear wall and a plurality of sidewalls forming an interior volume configured to receive a cellular phone therein, said body having a power supply, said body further including a central processing unit,
   a first light, said first light being integrally formed into said body, said first light configured emit a light therefrom so as to provide assistance in locating the cellular phone case;
   a first emergency request button, said first emergency request button operably secured to said body, said first emergency request button being operably secured to one of said four sidewalls, a second emergency request button, said second emergency request button being secured to one of said four sidewalls opposite said first emergency request button;
   a speaker, said speaker being secured to said body, said speaker being operable to emit a sound therefrom so as to assist in the location of the cellular phone case; and
   wherein the cellular phone case is communicably coupled to a key fob wherein the key fob provides initiation of said first light and said speaker.

2. The cellular phone case as recited in claim 1, and further including a second light, said second light being mounted to said body, said second light configured to emit light therefrom in order to assist in the location of the cellular phone case.

3. The cellular phone case as recited in claim 2, wherein the key fob further includes a controller, said controller having the necessary electronics to transmit signals to the cellular phone case.

4. The cellular phone case as recited in claim 3, wherein the key fob includes an audio activation button and a visual activation button configured to activate the speaker and said first light and second light respectively.

5. The cellular phone case as recited in claim 4, wherein the second light is secured to one of said plurality of sidewalls of said body.

6. The cellular phone case as recited in claim 5, wherein said first light is secured to the rear wall of said body.

7. The cellular phone case as recited in claim 6, wherein the cellular phone case further includes a central processing unit, said central processing unit being operably coupled to said first light, said second light and said speaker, said central processing unit further being wirelessly coupled to said key fob.

8. A cellular phone case having a cellular phone disposed therein that is configured to provide assistance in the location thereof comprising:
   a body, said body having a rear wall and four sidewalls forming an interior volume configured to receive a cellular phone therein, said body having a power supply, said body further including a central processing unit disposed therein,
   a first light, said first light being integrally formed into said body, said first light configured emit a light therefrom so as to provide assistance in locating the cellular phone case;
   a second light, said second light being secured to one of said four sidewalls of said body, said second light configured to emit light therefrom;
   a first emergency request button, said first emergency request button operably secured to said body, said first emergency request button being operably secured to one of said four sidewalls, a second emergency request button, said second emergency request button being secured to one of said four sidewalls opposite said first emergency request button;
   a speaker, said speaker being secured to said body, said speaker being operable to emit a sound therefrom so as to assist in the location of the cellular phone case; and
   wherein the cellular phone case is communicably coupled to a key fob wherein the key fob provides initiation of said first light and said speaker and;
   wherein the cellular phone case facilitates a request for emergency assistance via a cellular signal from the cellular phone subsequent the simultaneous depression of said first emergency request button and said second emergency request button.

9. The cellular phone case as recited in claim 8, wherein the key fob includes a housing, said housing having a controller disposed therein, said controller being operably coupled to said central processing unit, said key fob further including a speaker.

10. The cellular phone case as recited in claim 9, wherein the key fob includes an audio activation button and a visual activation button configured to activate the speaker and said first light and second light respectively.

11. The cellular phone case as recited in claim 10, wherein the first light is mounted to the rear wall of said body.

12. The cellular phone case as recited in claim 11, wherein the cellular phone case further includes a fob activation button, said fob activation button being operably coupled to said central processing unit, said fob activation button configured to facilitate the emission of sound from the speaker on the key fob ensuing the engagement thereof.

13. The cellular phone case as recited in claim 12, wherein said second light is mounted to one of said four sidewalls, said second light being rectangular in shape.

14. The cellular phone case as recited in claim 13, wherein the first light is formed in the shape of a specific logo.

15. A cellular phone case having a cellular phone disposed therein wherein the cellular phone case is communicably coupled to a key fob and wherein the cellular phone case is configured to provide an audio and a visual signal in order to assist in the location thereof comprising:
- a body, said body having a rear wall and four sidewalls forming an interior volume configured to receive a cellular phone therein, said body having a power supply, said body further including a central processing unit disposed therein, said central processing unit operably coupled to a cellular phone disposed therein,
- a first light, said first light being integrally formed into said body, said first light configured emit a light therefrom so as to provide assistance in locating the cellular phone case;
- a second light, said second light being secured to one of said four sidewalls of said body, said second light configured to emit light therefrom;
- a first emergency request button, said first emergency request button operably secured to said body, said first emergency request button being operably secured to one of said four sidewalls, a second emergency request button, said second emergency request button being secured to one of said four sidewalls opposite said first emergency request button;
- a speaker, said speaker being secured to said body, said speaker being operable to emit a sound therefrom so as to assist in the location of the cellular phone case;
- wherein the cellular phone case is communicably coupled to a key fob wherein the key fob provides initiation of said first light and said speaker, said key fob further including an audio speaker and;
- wherein the cellular phone case facilitates a request for emergency assistance via a cellular signal from the cellular phone disposed within the cellular phone case subsequent the simultaneous depression of said first emergency request button and said second emergency request button.

16. The cellular phone case as recited in claim 15, wherein the cellular phone case further includes a fob activation button, said fob activation button being operably coupled to said central processing unit, said fob activation button configured to facilitate the emission of sound from the audio speaker on the key fob ensuing the engagement thereof.

17. The cellular phone case as recited in claim 16, wherein the key fob includes an audio activation button and a visual activation button configured to activate the speaker and said first light and second light respectively.

18. The cellular phone case as recited in claim 17, wherein said second light is rectangular in shape.

19. The cellular phone case as recited in claim 18, and further including a power supply, said power supply disposed within said body, said power supply configured to provide power to the cellular phone case.

20. The cellular phone case as recited in claim 19, wherein the first light is formed in the shape of a specific logo.

* * * * *